Figure 1:
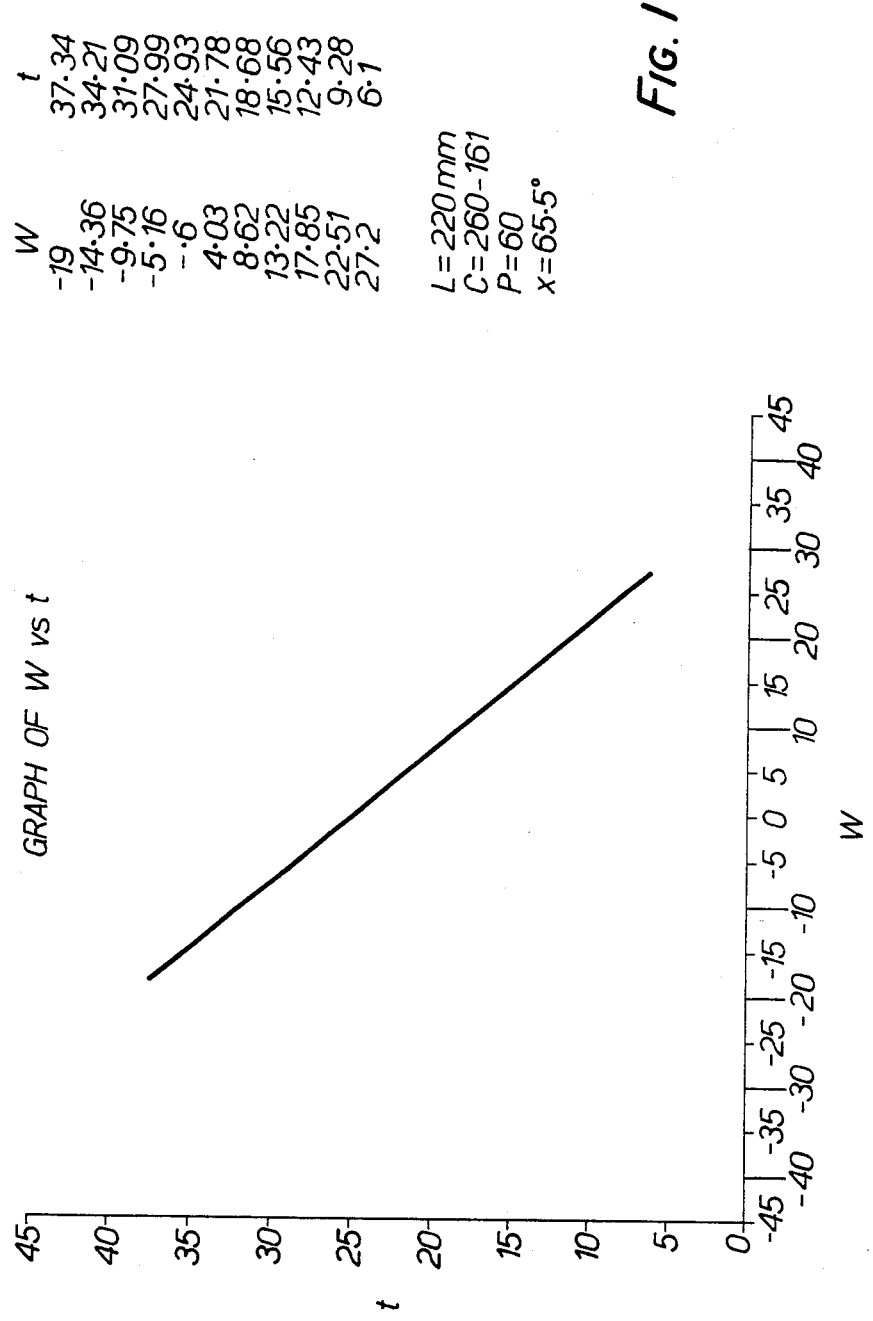

United States Patent [19]

Dinsdale et al.

[11] Patent Number: 4,580,258
[45] Date of Patent: Apr. 1, 1986

[54] PHONOGRAPH

[75] Inventors: Jack Dinsdale, Harrold; Robert S. Berks, Milton Keynes, both of United Kingdom

[73] Assignees: Cranfield Institute of Technology, Cranfield; Elite Townshend, Ltd., Walton-on-Thames, both of England

[21] Appl. No.: 609,147

[22] Filed: May 11, 1984

[30] Foreign Application Priority Data

May 13, 1983 [GB] United Kingdom ............... 8313192

[51] Int. Cl.⁴ .............................................. G11B 3/38
[52] U.S. Cl. .................................................. 369/250
[58] Field of Search .............................. 369/250, 244

[56] References Cited

U.S. PATENT DOCUMENTS

| | | | |
|---|---|---|---|
| 2,006,605 | 7/1935 | Putnoky | 369/250 |
| 3,059,934 | 10/1962 | Urmenyi | 369/250 |
| 3,313,546 | 4/1967 | Yoshikawa | 369/250 |
| 3,476,394 | 11/1969 | Birch | 369/250 |
| 3,813,100 | 5/1974 | Meyer | 369/250 |
| 3,826,505 | 7/1974 | Birch | 369/250 |
| 3,920,249 | 11/1975 | Birch | 369/250 |
| 3,924,860 | 12/1975 | Saito | 369/250 |
| 4,153,256 | 5/1979 | Guha | 369/250 |
| 4,316,280 | 2/1982 | Kanchev | 369/250 |
| 4,346,466 | 8/1982 | Kanchev | 369/250 |
| 4,497,053 | 1/1985 | Wolff | 369/250 |

FOREIGN PATENT DOCUMENTS

| | | | |
|---|---|---|---|
| 1358981 | 7/1974 | United Kingdom | 369/250 |
| 2053552 | 12/1980 | United Kingdom | 369/250 |
| 2052131 | 1/1981 | United Kingdom | 369/250 |

Primary Examiner—Steven L. Stephan
Attorney, Agent, or Firm—Mason, Kolehmainen, Rathburn & Wyss

[57] ABSTRACT

Apparatus for correcting or compensating for the tracking error of the pivotally mounted (1) tone arm (23) of a phonograph includes a first intermediate member (9) to which said tone arm (23) is pivotally (1) connected, a second intermediate member (12) which is rotatably connected to the first intermediate member (9) by a belt (18) and pulleys (13) which are sized in such a way that a photodiode source (21) and a photodiode detector (22) both carried by the second intermediate member (12) will tend to be indirectly moved by a motor to maintain them substantially constantly in register with a point on the tone arm (23). A slotted mask (24) carried by the tone arm (23) is interposed between the source (21) and the detector (22) and its slot defines a central "null" position in which said motor will not be driven when the required relationship exists. Deviation in either direction will cause the motor to be driven to re-establish this relationship. An insignificant maximum tracking error below 0.1° can readily be attained. Other constructions in which the second intermediate member (12) is omitted and in which the means to control operation of the motor are differently constructed and arranged are described and illustrated.

7 Claims, 5 Drawing Figures

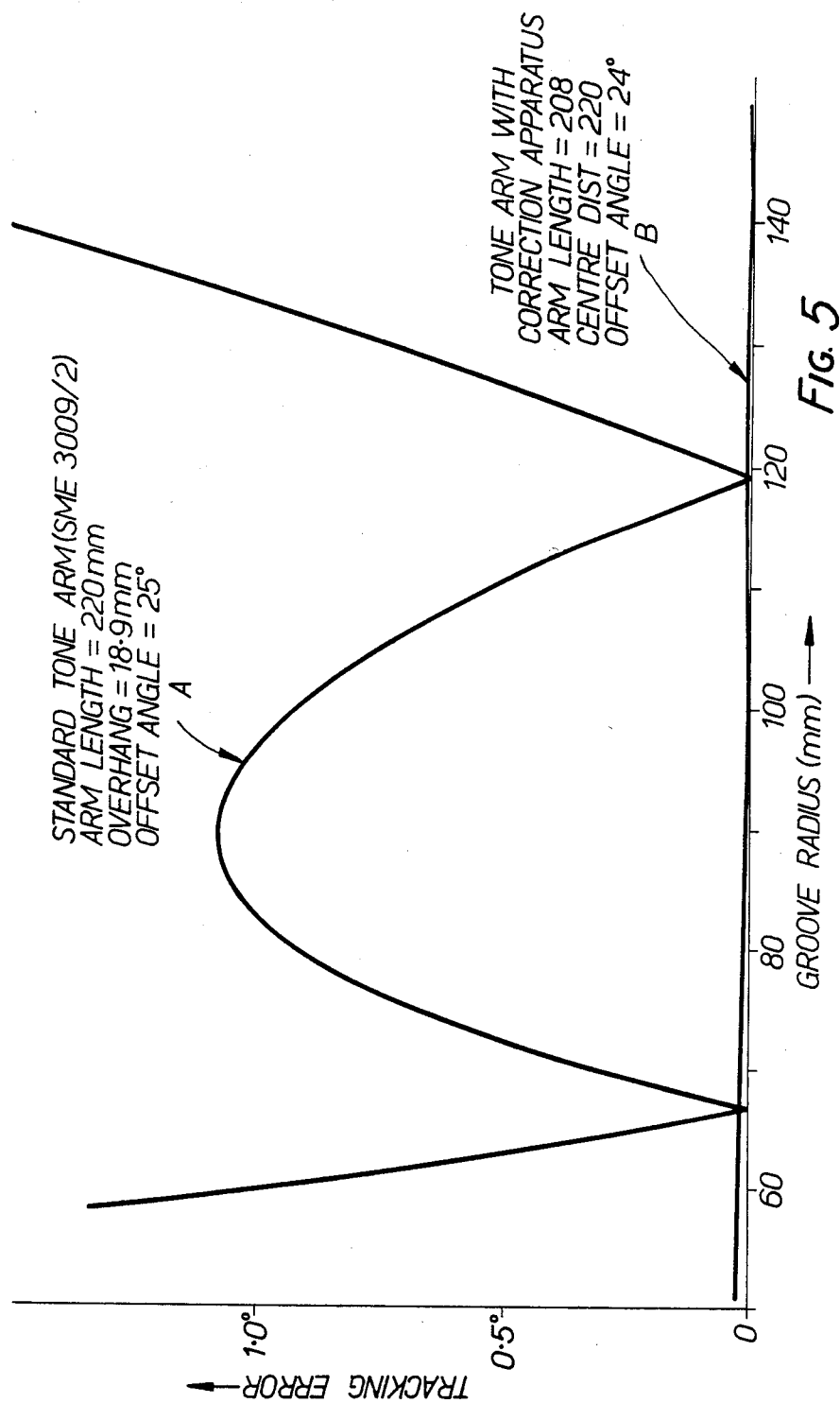

PHONOGRAPH

The present invention relates to phonographs for playing analogue, mechanically-tracked, records, as opposed to digital, laser-read, records.

In the manufacture of a phonograph record, a cutting tool, which vibrates in accordance with the signal to be recorded, is traversed radially in a straight line across the surface of a rotating master record disc from the edge towards the center, thus cutting a spiral groove which is modulated by the recorded signal. This master disc is then used to form vinyl records for playback, by a series of replicating processes. In the playback process, a pickup cartridge, which contains the replay stylus, is carried across the 300 mm or other diameter rotating vinyl record at the end of a pivotted arm, typically 200 mm long. The locus of the replay stylus is therefore a circular arc of 200 mm radius, unlike the linear radial path of the original cutting stylus. It has been shown by Baerwald, Stephenson and others that, by arranging the layout of the replay arm with respect to the center of rotation of the vinyl record so that optimized values of "overhang" and "offset" are achieved, the "lateral tracking error" can be minimized. "Overhang" is the linear distance by which the length of the arm from its pivot to the stylus tip exceeds the linear distance between the arm pivot and the center of rotation of the record disc. "Offset" is the angle between the fore-and-aft axis of the pickup cartridge and a line drawn from the stylus tip to the arm pivot.

"Lateral tracking error" is the angular error between the tangent to the groove of the vinyl record measured at the stylus tip, and the fore-and-aft axis of the pickup cartridge. Experts differ in opinion over the best formulae and values to use for optimizing the values of overhang and offset to minimize lateral tracking error. For example, a decision must be made as to what are the outer ($R_2$) and inner ($R_1$) recorded radii on the recorded disc, between which the values of tracking distortion will be minimized. These recorded radii are very likely to vary from record to record, and so a compromise must be made.

Formulae for calculating offset angle and overhang, which are accepted by many experts, have been quoted by Kessler and Pisha (Kessler, M. D. and Pisha, B. V.) in "Tonearm Geometry and Setup Demystified", Audi, January 1980 (U.S.A.) in dependence upon arm length L:

($N_1$) small null radius =

$$\frac{2 \cdot R_1 \cdot R_2}{\left[\left(1 + \frac{1}{\sqrt{2}}\right) \cdot R_2 + \left(1 - \frac{1}{\sqrt{2}}\right) \cdot R_1\right]}$$

($N_2$) large null radius =

$$\frac{2 R_1 R_2}{\left[\left(1 - \frac{1}{\sqrt{2}}\right) \cdot R_2 + \left(1 + \frac{1}{\sqrt{2}}\right) \cdot R_1\right]}$$

$$\text{optimum angular offset} = \sin^{-1} L \frac{N_1 + N_2}{\left[\frac{\left(\frac{N_1 + N_2}{2}\right)^2}{N_1 N_2} + 1\right]}$$

(A) mounting centre = $\sqrt{(L^2 - N_1 N_2)}$

Therefore overhang = $L - A$

These formulae may be used to derive values of overhang and offset which minimize tracking error. To use these formulae, the stages are:

(i) Decide on the maximum and minimum recorded radii between which the tracking is to be optimised. The arm length, from pivot to stylus, must also be known.

(ii) Calculate the two radii for zero lateral tracking error.

(iii) Substitute these values to calculate the values of overhang and offset.

Even when these (or similar) formulae are used, there is a finite value of error across the record, and the distortion resulting from this maximum value cannot be reduced below about 1%. This residual lateral tracking error is audible on very high quality record playing systems, in the use of which the two radii of zero error can be distinguished aurally from the remainder of the record disc, where tonal distortion and lack of coherency of audio images due to lateral tracking error become apparent.

According to the present invention, there is provided apparatus for correcting or compensating for the lateral tracking error of the pivotally mounted tone arm of a phonograph, said correction/compensation apparatus including first and second interconnected intermediate members both of which are angularly displaceable and to one of which the tone arm is pivotally connected, means constructed and arranged to sense the changing angularity of said tone arm that is due to changing tracking radius of the stylus which it carries while the apparatus is in use and a motor drivingly connected to move both intermediate members, those intermediate members being angularly displaceably interconnected in such a way that, in use, a point on one of them will be moved by operation of the motor, under the control of said sensing means, to tend to remain constantly in substantial register with a point on said tone arm thereby maintaining overhang at the optimum value to ensure minimum lateral tracking error.

The present invention stems from the knowledge that for given values of arm length and offset it is possible to obtain reduced or zero lateral tracking error across substantially an entire record disc by altering the value of overhang, for example, by altering the distance between the arm pivot and the center of the record, according to the instantaneous tracking radius of the stylus.

The invention may be implemented by moving the pivotal axis and it is then possible to design embodiments of the invention as a separate device which can be used to modify an existing phonograph.

Figure 2:
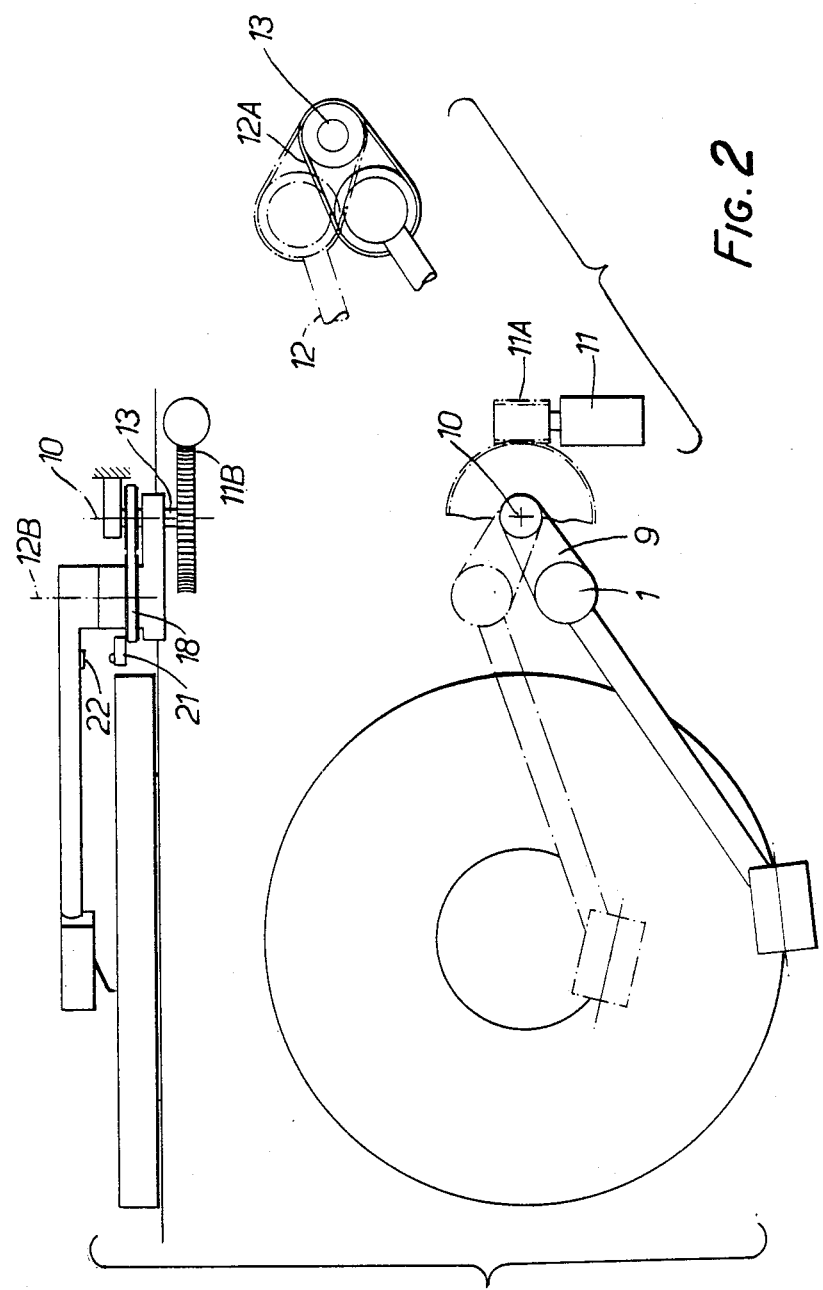
Figure 3:
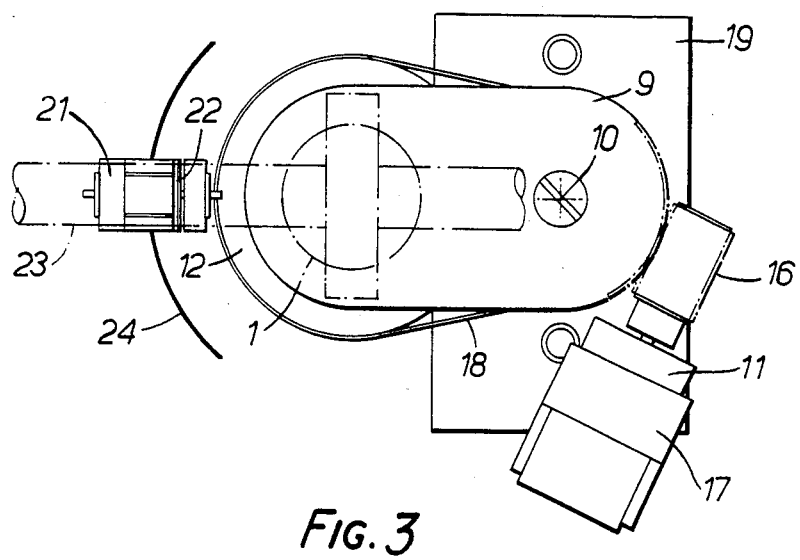
Figure 4:
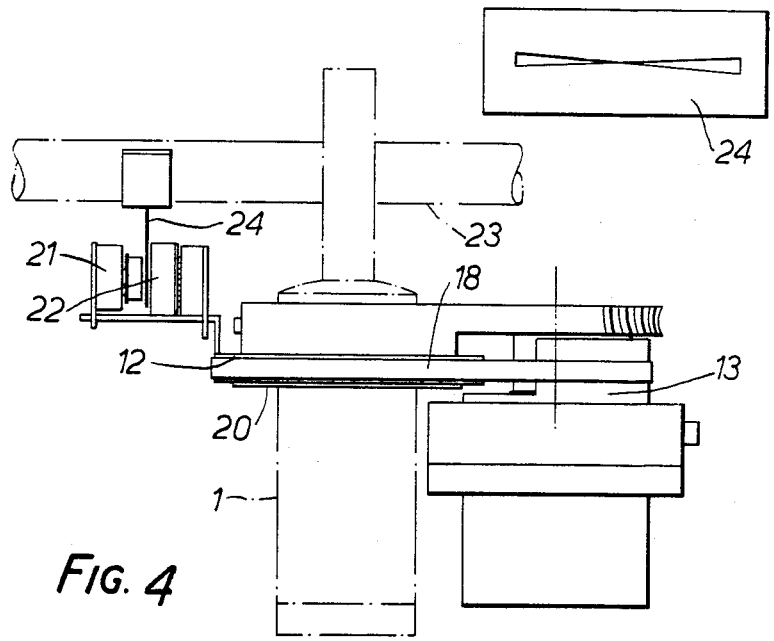

For a better understanding of the invention, and to show how the same may be carried into effect, reference will now be made, by way of example, to the accompanying drawings, in which:

FIG. 1 is a graph showing a linear relationship of value w to value t for an embodiment in accordance with the invention, FIG. 2 comprises a side elevation and two plan views illustrating one practical construction embodying the relationship of FIG. 1 of the drawings, FIG. 3 is a plan view, to an enlarged scale, showing a preferred construction for some parts corresponding to FIG. 2, FIG. 4 is a side elevation corresponding to FIG. 3 but omitting a motor whilst including an elevation showing the formation of a slotted mask, and FIG. 5 is a graph showing the relationship between lateral tracking error and instantaneous record groove radius for both a conventional record arm and one mounted in accordance with the embodiment of FIGS. 2 to 4 of the drawings.

Referring to the accompanying drawings, there now follows a Glossary of the Terms that are used in the following description and in those drawings, Linear Dimensions L = Effective arm length, i.e. from pivot to stylus tip (fixed)
P = Radius of intermediate link (eccentric member) (fixed)
C = Distance from platter center to eccentric fixed pivot (fixed)
$R_1$ = Inner modulated groove (fixed)
$R_2$ = Outer modulated groove (fixed)
$N_1$ = Small null radius (fixed)
$N_2$ = Large null radius (fixed)
A = Mounting centre for optimum arm geometry (fixed)

Angles

Offset angle (fixed) = the angle between the groove tangent and center-line of tone-arm.
t = angle between arm center-line and intermediate member
w = angle of rotation of intermediate member measured from the center of rotation of this member to (I) the arm pivot and (II) the platter center. In the absence of any intermediate member, w would equal the angle between the tone arm center line and a line from the platter center to the tone arm pivot.

The present invention is similar to the prior art in that it also employs an intermediate member capable of being angularly displaced, with the tone arm pivot mounted eccentrically on this intermediate member, but differs therefrom in that it also employs a second intermediate member which rotates with the pivoting arm as it allows the pickup to track the record groove. By employing a simple following servo system to maintain a constant angular relationship between the auxilliary or second intermediate member and the arm, it is possible substantially to eliminate lateral tracking error.

FIG. 1 is a graph of w vs. t showing a linear relationship between w and t.

With this relationship, a point on a second intermediate member which is constrained to move angularly below the tone arm pivot and which is geared to rotate so that its relationship to w is the linear relationship between w and t, will track a point on the tone arm, and therefore the complete system may be controlled by "slaving" a point on this second intermediate member to follow a point on the tone arm, thus eliminating the need for any system to hold non-linear relationships as dislcosed by prior art proposals.

A mechanical arrangement for this embodiment is shown in FIG. 2. A tone arm pivot 1 is mounted on a first intermediate member 9 which can move angularly in ball or other low-friction bearings about a center 10 under the action of a fiducial servomotor 11 which drives via the worm and pinion gearing 11A. A second intermediate member 12 is rotatable about a vertical bearing 12 in alignment with the tone arm pivot 1, and is connected by a pulley/belt arrangement 18 to a spindle 13 which is fixed to a base at the center 10. The drive ratio between the second intermediate member 12 and the spindle 13, e.g. the ratio of pulley diameters, is set to be equal to the slope of the linear relationship between w and t, as shown in FIG. 1. A tracking photodiode source 21 and detector 22 are mounted on the member 9 and the tone arm, respectively.

FIGS. 3 and 4 of the drawings show a modification of the construction illustrated in FIG. 2 in which modification the arm pivot 1 is again mounted on the first intermediate member 9 which latter is rotatable about the center 10 by way of ball or other low-friction bearings and a vertical shaft which physically embodies that center 10. The required angular displacement of the member 9 is effected by the servomotor 11 through the intermediary of a worm and pinion arrangement 16, the servomotor 11 being releaseably secured to a base 19 by a bracket 17. The previously mentioned second intermediate member 12 is rotatable about a ball or other low-friction bearing defining a pivotal axis which is in alignment with that defined by the arm pivot 1. The second intermediate member 12 is retained in its operative position by a plate 20 and is connected by the pulley/belt arrangement 18 to the spindle 13 which acts as a fixed pulley that is fastened to the base 19 and whose central axis coincides with the center 10. The fixed spindle or pulley 13 is of a tubular formation containing the vertical shaft which physically affords the center 10 and the bearings which enable that shaft to be angularly displaceable relative to the spindle/pulley 13.

The drive ratio between the pulley-like second intermediate member 12 and the spindle/pulley 13 depends, of course, upon the relative diameters thereof and this relationship between those diameters is set, by appropriate sizing, to equal the linear relationship between the values w and t that is shown in FIG. 1. In this modified construction, both the photodiode source 21 and the photodiode detector 22 are mounted on the second intermediate member 12 substantially beneath the tone arm which is indicated by the reference 23 in FIGS. 3 and 4, said source 21 and detector 22 being in axial register and closely spaced apart relationship with one another. A slotted mask 24 depends from a bracket carried by the tone arm 23 and has a regularly cylindrically curved configuration whose axis of curvature coincides with that of the arm pivot 1. A detail in FIG. 4 shows one possible configuration of the slot in the mask 24, the "servo-null" position being at the center of that slot which is of symmetrically divergent-edged formation in opposite directions from the centre. Alternatively, the slot in the mask 24 may take the form of two horizontal rectangular slits, displaced one from the other in the vertical plane, and the photo-diode source 21 and the detector 22 may each be duplicated so that each source/detector pair cooperates with one of the slits in the mask 24. The advantage of the arrangement shown in FIGS. 3 and 4 of the drawings is that, when the tone arm 23 is moved rapidly at, for example, the commencement or completion of a record-playing operation, or when a user wishes to locate a particular portion of the groove without having to hear the remainder of the record, the aligned reference position relationship between the source 21 and the detector 22 is not temporarily lost and the increased illumination of the detector 22 by the source 21 through a "wider"

portion of the slot in the mask 24 causes the fiducial servomotor 11 immediately to operate and quickly regain a minimum tracking error position of the system in which the center of the slot in the mask 24 will lie between the source 21 and the detector 22. A similar advantage is given by the described alternative arrangement.

FIG. 5 of the drawings illustrates graphically the very considerable reduction in tracking error that results from employing either embodiment of the invention. Curve A shows the variation in lateral tracking error in degrees that occurs for a conventionally pivoted tone arm, when correctly set up, playing a 12" (305 mm.) record from its outer recorded radius of 146 mms. to its inner recorded radius of 58 mms. It will be seen that the tracking error at the outer radius of 146 mms. commences at 2° but reduces to 0 degrees at a radius of 119 mms. The error rapidly builds up again at 1.2° at a 90 mm. radius and rapidly reduces again to 0° at a 67 mm. radius. However, the error builds up again to 1.3° by the time that the inner radius of 58 mms. is reached.

Curve B on the graph of FIG. 5 shows the situation when the tone arm is mounted to correct, or compensate for, lateral tracking error in accordance with either FIG. 2 or FIGS. 3 and 4 of the drawings. The curve B shows a lateral tracking error significantly below 0.1° throughout the entire recorded area.

Each whole degree of lateral tracking error corresponds to approximately 1% second harmonic distortion where the lateral tracking error is relatively low and, with a maximum tracking error of less than 0.1° on the curve B of FIG. 5 of the drawings, it will be seen that this distortion is so low as to be insignificant for all practical purposes. This very low lateral tracking error, and its relatively slow rate of increase and subsequent decrease during the playing of a record, result in an improved and consequently more pleasing sound quality which more faithfully reproduces the originally recorded music, speech or other sound material. Naturally, the rate of wear of both records and styli is significantly reduced as compared with the use of a tone arm which is not provided with tracking error correction/compensation in accordance with the invention. Both embodiments of of the invention and the graphic representation of FIG. 5 relate to a tone arm having an effective length of 220 mms with an offset of 25° and an overhang of 18.9 mms.

What is claimed is:

1. Apparatus for correcting or compensating for the lateral tracking error of the pivotally mounted tone arm of a phonograph by controlling the distance between the axis of angular displacement of that tone arm and the axis of rotation of a turntable of said phonograph, said correction/compensation apparatus including first and second interconnected intermediate members both of which are angularly displaceable about corresponding upright axes and to one of which members the tone arm is pivotally connected, means constructed and arranged to sense the changing angularity of said tone arm with respect to a record disc being rotated by said turntable, which changing angularity is due to progressive alteration in the radius of tracking of a stylus which the tone arm carries while the apparatus is in use, and a motor drivingly connected to move both intermediate members, said intermediate members being angularly displaceably interconnected with a predetermined transmission ratio between them in such a way that, in use, a point on one of them will be moved by operation of the motor, under the control of said sensing means, to tend to remain constantly in substantial register with a point on said tone arm, thereby maintaining at the optimum value to ensure minimum lateral tracking error the linear distance by which the length of said tone arm from its pivotal connection to said one intermediate member to the tip of said stylus exceeds the linear distance from said pivotal connection to the axis of rotation of said turntable.

2. Apparatus according to claim 1, wherein the predetermined transmission ratio interconnection between said first and second intermediate members comprises fixed and rotatable pulleys of different sizes and belt means drivingly embracing those pulleys.

3. Apparatus according to claim 1, wherein one of the intermediate members carries both a source of energy and a detector of energy derived from that source which detector governs the supply of power to said motor, said source and detector being juxtaposed with a mask of the apparatus, defining at least one slot, said mask being carried by said tone arm and interposed between said source and said detector, and wherein said at least one slot is so formed as to define a substantially central position which, when aligned between the source and the detector, will prevent sufficient energy being received from said source by said detector to cause operation of the motor.

4. Apparatus according to claim 3, wherein said mask has two slots in the form of horizontal rectangular slits displaced from one another in the vertical plane, said source and detector being duplicated with each source/detector pair cooperating with a corresponding one of said slits.

5. Apparatus according to claim 3, wherein said at least one slot in said mask is shaped to define two substantially symmetrical triangles of relatively small base length and apex angle, the apices of the two triangles coinciding in position substantially centrally of the slot with both triangles becoming progressively greater in width away from that substantially central position towards their respective bases.

6. Apparatus according to claim 1, wherein said sensing means comprises a photodiode source and a photodiode detector.

7. Apparatus according to claim 1, wherein the motor is a fiducial servomotor.

* * * * *